US005217791A

United States Patent [19]

Fujita et al.

[11] Patent Number: 5,217,791

[45] Date of Patent: Jun. 8, 1993

[54] PRINTED FILM SHEET

[75] Inventors: Seigoro Fujita; Yoichi Fukuzawa, both of Amagasaki, Japan

[73] Assignee: Kanzaki Paper Mfg. Co., Ltd., Tokyo, Japan

[21] Appl. No.: 720,878

[22] Filed: Jun. 25, 1991

[30] Foreign Application Priority Data

Jun. 30, 1990 [JP] Japan .................................. 2-173105

[51] Int. Cl.[5] .......................... B32B 7/12; B32B 3/00; B32B 7/00; B44F 1/06

[52] U.S. Cl. ...................................... 428/204; 428/38; 428/206; 428/207; 428/355; 428/542.6

[58] Field of Search ................. 428/204, 206, 207, 38, 428/195, 413, 542.6, 355

[56] References Cited

U.S. PATENT DOCUMENTS

| | | | |
|---|---|---|---|
| 3,900,641 | 8/1975 | Woodman et al. | 428/38 |
| 4,127,689 | 11/1978 | Holt | 428/204 X |
| 4,436,377 | 3/1984 | Miller | 428/204 X |
| 4,478,910 | 10/1984 | Oshima et al. | 428/206 X |
| 4,879,148 | 11/1989 | Neaves et al. | 428/206 X |
| 4,916,007 | 4/1990 | Manning et al. | 428/204 X |
| 4,965,124 | 10/1990 | Shiraishi et al. | 428/206 X |

*Primary Examiner*—George F. Lesmes
*Assistant Examiner*—D. R. Zirker
*Attorney, Agent, or Firm*—Flynn, Thiel, Boutell & Tanis

[57] ABSTRACT

A printed film sheet in which an image printed on a transparent film sheet can be seen from both the printed side and the non-printed side of said film sheet. The transparent film sheet is provided with a coating composition containing one or more pigments and one or more adhesives so that said film sheet has a brightness of above 50%. The pigments include one or more pigments having a linseed oil absorption of 10 to 80 ml/100 g in an amount of 70 to 100% by weight of the total pigment content. The film sheet has an opacity of 20 to 60% and is printed so that the difference between the ink density of a printed image on the printed side of said film sheet and the ink density thereof on the non-printed side of said film sheet is below 35%.

10 Claims, No Drawings

PRINTED FILM SHEET

BACKGROUND OF THE INVENTION a. Field of the Invention

The present invention relates to a printed film sheet comprising an originally transparent film modified to be semitransparent by applying a coating composition thereto, then said film being printed thereon. The printed film sheet of the present invention is used for display, and is chiefly attached to a transparent plate of glass, plastic, etc. When the printed film sheet is attached thereto, an image printed on said sheet looks graphic and vivid on both the printed side and the reverse side of said sheet.

b. Description of the Prior Art

The printed film sheet of the present invention is attached to a windowpane, etc. of a building so that the windowpane looks like a stained glass. Also, the printed film sheet of the present invention may be used as an interior material like a stained glass in natural or artificial light for example by attaching said sheet to a transparent partition, screen, etc. within a room.

In recent years, with the diversification of buildings, there have been various styles of windowpanes and room interiors. For example, in modern department stores and hotels, or places called intelligent buildings or event halls, there are interior designs having transparent screens through which each compartment can be seen from a distance, as well as glazed showrooms and show windows in which various exhibits and new products are displayed.

Various posters and advertising bills mainly made of paper are often stuck on both the obverse side and the reverse side of transparent glass constituting glazed showrooms and show windows. However, such printed matters mainly made of paper may become corrugated or rugged because of changes in ambient temperature. If such printed matters are on the outside of the glass exposed to wind and rain, they are often damaged and spoiled by wind and rain.

In some cases, printed transparent films or printed opaque films which resist temperature changes as well as wind and rain are used in the same manner as mentioned above. In said transparent films, a printed image is seen also on the reverse side. However, the printed image looks flat and darkish, the lights and shades thereof being obscure. Therefore, in some of said transparent films, a white ink is applied onto the printed surface so that the printed image looks graphic from the non-printed side. In this case, however, the image on the printed side looks dull because the image surface is covered with the white ink, and therefore the printed image does not look alike from both sides of the film.

In said printed opaque films, the films themselves are opaque. Therefore, it is not at all possible to recognize the image from the reverse side. Furthermore, since the transparent glass is shaded by such an opaque film, it is necessary to stick the same film on both the obverse side and the reverse side of the transparent glass. This is true of conventional printed matters printed on a coated film sheet comprising a synthetic paper (a kind of synthetic film) coated with pigments to improve printability. In such a coated film sheet, the printed image has a good contrast between a subject and its surrounding background because printing is made on the surface of the coating layer of pigments. However, said coated film sheet is no better than printed matters on paper because the sheet itself is opaque.

So far there has been no printed film sheet which makes it possible to recognize the image from both the printed side and the reverse side thereof surely and in a well-balanced manner and, at the same time, displays the image graphically and vividly like a stained glass in natural or artificial light.

SUMMARY OF THE INVENTION

It is an object of the invention to provide a novel printed film sheet ensuring a printed image which can be clearly recognized from both the printed side and the reverse side thereof, said image having an excellent contrast between a subject and its surrounding background. This object is attained by providing a transparent film base with a specific coating layer of pigments to give said film a brightness and an opacity each within a specific range and, at the same time, controlling within a specific range the difference between the ink density of the printed image on the printed side of said film and the ink density thereof on the reverse side of said film.

It is another object of the invention to provided a printed film sheet which withstands environmental changes indoors and outdoors and is fashionable enough to be used as an interior material.

To achieve the above-mentioned objects, the present invention provides a printed film sheet comprising a transparent film sheet provided with a coating composition containing one or more pigments and one or more adhesives, the surface coated with said pigments being adapted to have a brightness of above 50%, said pigments including one or more pigments having a linseed oil absorption of 10 to 80 ml/100 g in an amount equal to 70 to 100% by weight of the total pigment content, further controlling the opacity of the film sheet to be between 20% and 60%, and the difference between the ink density of the printed image on the printed side and the ink density thereof on the reverse side (non-printed side) being below 35%.

One of the means for ensuring that an image printed on one side of a transparent film sheet looks alike both on the printed side and the reverse side of said film sheet is to decrease the difference between the ink density of the printed image on the printed side and the ink density thereof on the reverse side. As said difference is decreased, the printed image looks clearer on both sides of the film sheet and has a better reproductiveness. In the present invention, a desired image is printed on one surface of a transparent film provided with a coating layer of one or more pigments, the printing ink of said image passing through said coating layer of pigments, thereby the coating layer in a printed (image) portion being made transparent so that the printed image of ink is seen also on the reverse side (non-printed side). If the permeation of ink applied on said coating layer of pigments on the film sheet is stopped in the upper or middle portion of said coating layer, the printed image looks thin and obscure on the reverse side (non-printed side). If the printing ink permeates said coating layer near or to the lower surface thereof (to the non-printed film surface), the printed image looks much the same on both the printed side and the reverse side.

In the present invention, the transparent film is provided on one surface thereof with the coating layer of pigments having a brightness of above 50%, thereby giving said film a certain degree of opacity or semitransparency. When printing is applied onto said coating layer having such a relatively high brightness, the contrast between the subject of the printed image and the background thereof is enhanced, thereby the printed image is made graphic and vivid. Thus, the area surrounding the subject is recognized as being a background having a certain degree of opacity and the subject looks graphic and vivid without being directly affected by light from the surrounding area. If the surrounding area is transparent, light passing through the area is too strong, and the image looks flat and dull. Therefore, it is necessary to give a certain degree of opacity to the sheet itself. This is one of the requirements of the present invention. As described below, if the opacity is below 20%, the opacity is insufficient and light passing through the surrounding area makes the printed image flat and dull. If the opacity is above 60%, the ink density on the non-printed side is too low and it is difficult to clearly recognize the printed image from the non-printed side.

The above-mentioned contrast will be described further. Generally speaking, as the contrast is enhanced, the image becomes more vivid, and as the contrast is reduced, the image becomes duller. As the ink density of the subject of the printed image is increased or as the whiteness of the background surrounding the subject is increased, the contrast between them becomes better. In the present invention, the brightness of said coating layer corresponding to the background surrounding the subject is maintained above 50% in order that said contrast is improved and the printed image is clearly recognized.

Said brightness is determined by a method in accordance with JIS P 8123. If the brightness is below 50%, the whiteness is insufficient and ink density is reduced. Therefore, the contrast between the subject and the background of the printed image is spoiled and the clearness of the printed image is lost. It is preferable to make the brightness as high as possible but, in practice, it is difficult to obtain a brightness of above 90%.

The opacity of the coated film sheet, which depends upon the amount of said coating composition containing white pigments, can be in practice adjusted within a range of about 5% to 95%. In the present invention, the opacity of the coated sheet is limited to a range of 20% to 60% as described in detail below.

As a result of earnest study concerning the opacity of printed film sheets and the transparency of the subject portion of an image, the inventors have successfully made a transparent film sheet opaque within a specific range, and found it necessary that said transparent film is coated on one surface thereof with one or more specific pigments which allow the passage of a printing ink and have a great influence on the transparency of the printed portion, and then an image is printed on the surface coated with a coating composition containing said pigments. The passage of a printing ink depends upon the oil absorption of pigments used.

The pigments contained in a coating layer provided on the transparent film sheet will be described in detail below.

White pigments have two main functions. One is to adjust the degree of transparency and the whiteness of the transparent film. The other is to receive a printing ink. The ink receptivity is particularly important.

The ink receptivity has a close interrelationship with the linseed oil absorption which depends upon pigments contained in the coating layer. If the linseed oil absorption is in a suitable range, gaps in the coating composition are filled with ink vehicle and a portion through which ink has passed is made transparent.

In the present invention, one or more pigments having a linseed oil absorption of 10 to 80 ml/100 g under a method of JIS K 5101 are used. In the case of pigments having a linseed oil absorption of below 10 ml/100 g, particles thereof generally have a small specific surface area, which means that they are too coarse, the opacity of the coated sheet being too low, ink permeation being too fast, as a result the ink density on the printed side being unfavorably too low. In case of pigments having a linseed oil absorption of above 80 ml/100 g, the ink density on the non-printed side is unfavorably too low.

The amount of said specific pigments used is also important. If the amount of said specific pigments used is below 70% by weight of the total pigment content, the subject of an image printed on the coated surface has a rather too low ink density on the non-printed side (reverse side), the contrast between the ink density on the printed side and the ink density on the non-printed side is too sharp, thus, the image is unbalanced.

Therefore, in the present invention, said specific pigments are used in an amount of 70 to 100% by weight of the total pigment content.

As mentioned above, it is an object of the present invention to provide a printed film sheet having a printed image which can be clearly recognized from both the printed side and the reverse side thereof. If the printed image can be recognized only from one side of the film sheet, said object is not achieved. To ensure that the printed image can be clearly recognized from both the printed side and the reverse side of the film sheet, the film sheet must have a suitable degree of opacity. Therefore, in the present invention, the opacity of the film sheet is limited to a range of 20 to 60% as determined by a method in accordance with JIS P-8138. If the opacity of the film sheet is below 20%, the opacity is insufficient and the printed image is flat and dull because light passes through the background surrounding the subject of the image. If the opacity of the film sheet is above 60%, the ink density on the non-printed side is too low and it is difficult to clearly recognize the printed image from the non-printed side. To obtain a suitable degree of opacity, it is necessary to adjust the amount of the coating layer of pigments and the kinds of pigments and adhesives. The amount of the coating layer of pigments and the kinds of pigments and adhesives are not particularly limited and may be determined according to the purpose.

To make the printed image look better, that is, to ensure that the image printed on the coated film looks much the same from both the printed side and the non-printed side thereof, the difference between the ink density on the printed side and the ink density on the non-printed side is preferably below 35%, more preferably below 30%. If the difference is above 35%, the density of the printed image on the printed side is much different from the density thereof on the non-printed side. If the difference is much larger, the printed image can be recognized from the printed side only and the above-mentioned object of the present invention is not achieved.

The ink density of the printed image was determined by means of an ink density meter ("GRETAG D-142-3" made by GRETAG, Switzerland). In the determination, the ink density must be maintained in a range of 0.2 to 2.5 for all of the four colors: cyan (blue), magenta (red), yellow and black. The difference (DX in %) between the ink density on the printed side and the ink density on the non-printed side must satisfy the following equation:

$$DX = \frac{A - B}{A} \times 100 \leqq 35 \text{ (preferably 30)}$$

Notes:
$DX$ (%): Difference between ink densities.
The effective range of ink density $A$ is as follows:
$0.2 \leqq A \leqq 2.5$
$A$, $B$: Ink densities on the printed side and the non-printed side. "$A$" is a higher ink density. "$B$" is a lower ink density.

As mentioned above, in the present invention, one or more white pigments having a linseed oil absorption of 10 to 80 ml/100 g, as determined by a method under JIS K 5101, are used. For example, the pigments may be any of the following: inorganic pigments such as ground calcium carbonate, precipitated calcium carbonate, kaolin, talc, calcium sulfate, titanium oxide, zinc oxide, barium sulfate, zinc sulfade, barium carbonate, magnesium silicate, aluminum hydroxide, diatom earth, alumina and lithopon; and organic fine particles such as plastic pigments and micro capsules.

Adhesives contained in the coating composition of the present invention may be any of the following: water-soluble high polymer adhesives such as oxidized starch, etherized starch, esterified starch, dextrine and other starches, carboxymethyl cellulose, hydroxyethyl cellulose and other cellulose derivatives, casein, gelatine, soyabean protein, polyvinyl alcohol and derivatives thereof; and thermoplastic resins such as maleic acid anhydride, styrene-butadiene copolymer, methacrylatebutadiene copolymer and other conjugated diene polymer latexes, acrylic polymer latexes including polymers and copolymers of acrylic (methacrylic) ester, ethylene-vinyl acetate copolymer and other vinyl polymer latexes, functional group denatured polymer latexes comprising a functional group such as a carboxyl group incorporated into any of said polymers, polymethylmethacrylate, polyurethane resins, unsaturated polyester resins, vinyl chloride, vinyl acetate copolymers, polybutyral-alkyd resins and other synthetic resin adhesives. These adhesives are used in an amount of 5 to 60 parts, preferably 10 to 55 parts, per 100 parts of pigments.

Among said adhesives, a combination of one or more thermoplastic resins and one or more epoxy resins is preferably used because it increases the adhesive force, particularly the water resistance, of the coating layer.

Among said thermoplastic resins, thermoplastic resins having a degree of kerosine swelling of 80 to 200% are preferably used because they quicken ink absorption and improve the transparency of the printed image. If such thermoplastic resins are used, even pigments having a relatively high oil absorption and an inferior transparency are adapted to have desired qualities and, as a result, a wider range of pigments can be used. Said thermoplastic resins having a degree of kerosine swelling of 80 to 200% include butadiene copolymers. Butadiene copolymers having a butadiene content of 45 to 90% by weight of the total copolymer weight are preferable.

The degree of kerosine swelling of a thermoplastic resin is determined as follows: A small amount of the thermoplastic resin is dried and a portion thereof having a dry weight of 0.5 g is picked up and chopped finely. The chopped resin is immersed in 30 ml of kerosine and vibrated for 3 hours. Then, the resin is filtered by means of a stainless steel net of 200 mesh, and the resin on the net is weighed. The degree of kerosine swelling is calculated on the basis of the weight of the resin as follows:

$$\text{Degree of kerosine swelling (\%)} = \frac{W - 0.5}{0.5} \times 100$$

[Note]
$W$: weight of the resin after absorbing kerosine

Each of said epoxy resins used together with said thermoplastic resins is a compound having two or more reactive epoxy groups within the molecule. Among the epoxy resins, water-soluble epoxy compounds made by glycidylating epichlorohydrin are preferably used.

Said water-soluble epoxy compounds may be any of the following, for example: A di- or polyglycidyl ether of a glycol and of an aliphatic polyhydric alcohol, a diglycidyl ester of a dicarboxylic acid, an epoxy compound having a nitrogen-containing hetro ring, ethylene glycol diglycidyl ether, diethylene glycol diglycidyl ether, triethylene glycol diglycidyl ether, polyethylene glycol diglycidyl ether (n=5, 9, 13, 23, etc.), propylene glycol diglycidyl ether, dipropylene glycol diglycidyl ether, polypropylene glycol diglycidyl ether (n=3, 7, 11, etc.), glycerol diglycidyl ether, glycerol triglycidyl ether, trimethylol propane triglycidyl ether, diglycerol polyglycidyl ether, sorbitol polyglycidyl ether, diglycidyl succinate, diglycidyl adipate, diglycidyl dimethyl hydantoin, glycidyl trimethyl ammonium, furfuryl glycidyl ether, trimethylolethane triglycidyl ether, 3-methylpentanetrial triglycidyl ether, polyglycerol triglycidyl ether, glycerol ethylene oxide triglycidyl ether, etc. Of course, two or more of them may be used together.

Said epoxy resins are used preferably in an amount equal to 1 to 20 parts by weight per 100 parts by weight of the pigment content in the coating layer. If the amount of the epoxy resins is below 1 part by weight, a coating layer obtained may not have sufficient water resistance. If the amount of the epoxy resins is above 20 parts by weight, printing ink may not dry well. If the total amount of the thermoplastic resins and the epoxy resins exceeds 55 parts by weight, printing ink may not dry well. The total amount of the thermoplastic resins and the epoxy resins should be decided in view of this point.

Although the mutual action of the epoxy resins and the thermoplastic resins is not necessarily clear, it is presumed that the epoxy groups of the epoxy resins and the hydroxyls, carboxyl groups, carbonyl groups, etc. of the thermoplastic resins show effective reactions and form bridges when the coating layer is heated and dried, thus excellent water resistance and adhesive force is obtained.

The coating composition of pigments forming the coating layer may contain, as required, some additives such as dispersing agents, viscosity increasing agents, flow modifiers, antistatic agents, water-resisting agents, defoamers, antifoamers, releasing agents, coloring agents and foaming agents.

The base of the sheet used in the present invention may be a transparent film which may be made of any of the following thermoplastic resins, for example: polyester, polystyrene, polyvinyl chloride, polymethyl methacrylate, cellulose acetate, polyethylene, polypropylene, polycarbonate, etc. It is to be noted, however, that the material of the transparent film base is not limited thereto. As long as the film base maintains transparency, the film base may be decorated for example by embossing or thin coloring of rainbow hues, etc. Also, the film base may be shrinkable.

Generally speaking, the film has a thickness of about 10 to 500 μm. However, the film thickness is not limited thereto.

The above-mentioned coating layer of pigments is applied onto said film base by means of any conventional coaters, for example, a blade coater, air knife coater, roll coater, brush coater, curtain coater, die coater, bar coater, gravure coater, spray coater, etc.

The amount of the coating layer of pigments is generally in a range of 2 to 60 $g/m^2$, preferably 5 to 40 $g/m^2$. If the amount thereof is too small, printing ink does not dry well. If the amount thereof is too large, the ink density on the film surface is reduced. An intermediate layer may be provided between the film base and the coating layer of pigments in order to obtain better adhesion between them.

The coating layer of pigments may be dried by steam heating, hot air heating, gas heater heating, electric heater heating, infrared ray heater heating, high frequency heating, laser heating, electron beam heating, etc. The surface temperature of the film base is preferably adjusted according to the material of the film base. The coated sheet thus obtained by applying the coating layer to the base may be used as it is or glossed and smoothed by means of a super calender, a gloss calender, etc.

The printed film sheet may be coated on the printed side or the non-printed side thereof with a tackifier so that it is used as a tack sheet. Particularly in a case where the printed film sheet is coated on the printed side thereof with a tackifier, the transparent film surface is exposed on the obverse side. In this case, the printed film sheet has sufficient gloss as a printed matter and offers a satisfactory attraction as an advertisement. Also, the printed image is effectively protected from friction.

If a tackifier having an excellent transparency is used, it is possible to obtain a tack sheet offering a printed image which can be seen with a good contrast from both the printed side and the non-printed side.

Such a tack sheet coated with a suitable tackifier may be used as a film sheet for the protection of printed tablecloths. Also, the tack sheet may be attached to the glass, etc. of building windows and skylights like a stained glass, or it may be used for interior decoration by attaching it to blinds or partition screens.

It is of course possible to subject the printed film sheet of the present invention to various kinds of finishes and treatments used in the art to which the invention pertains. For example, the printed film sheet may be subjected to antistatic treatment. Also, the printed film sheet may contain in a certain portion thereof auxiliary agents such as ultraviolet absorption agents and antioxidants to improve the preservation of the printed image on the sheet.

DESCRIPTION OF PREFERRED EXAMPLES

The present invention will now be described in detail with reference the examples. It is to be understood that the present invention is not limited to the examples. In the examples, "parts" or "%" (percent) means "parts" or "%" by weight unless otherwise stated.

EXAMPLE 1

A pigment slurry having a solid matter concentration of 60% was obtained by mixing, by means of an agitator, 80 parts ground calcium carbonate having an oil absorption of 31 ml/100 g ("Softon 1200" made by Bihoku Funka Kogyo Co., Japan), 20 parts aluminum hydroxide having an oil absorption of 43 ml/100 g ("Higilite H-43" made by Showa Denko K.K., Japan) and 0.5 part sodium polyacrylate. The pigment slurry thus obtained was mixed with 4 parts (solid matter) epoxy resin ("DENACOL EX-810" made by NAGASE CHEMICALS LTD., Japan), 15 parts (solid matter) styrenebutadiene copolymer latex having a butadiene content of 34% ("T-1242" made by NIPPON ZEON Co., Ltd., Japan), 3 parts (solid matter) antistatic agent, 2 parts (solid matter) zirconium ammonium carbonate and water so that the solid matter concentration was 55%. Thus, a coating composition of pigments was obtained.

The coating composition was applied by means of a bar coater onto one side of a transparent polyester film having a thickness of 75 μm ("ESTER FILM A-1300" made by Toyobo Co., Ltd., Japan) so that the dry weight was 15 $g/m^2$. Then, the polyester film was dried for 30 seconds by means of a hot air drier at a temperature of 60° C., and calendered by means of a supercalender. Thus, a coated sheet was obtained.

EXAMPLE 2

A coated sheet was obtained in the same way as in Example 1 except that ground calcium carbonate having an oil absorption of 19 ml/100 g ("P-50" made by Shiraishi Kogyo Co., Japan) was used in place of said ground calcium carbonate having an oil absorption of 31 ml/100 g.

EXAMPLE 3

A coated sheet was obtained in the same way as in Example 1 except that ground calcium carbonate having an oil absorption of 38 ml/100 g ("Softon 2200" made by Bihoku Funka Kogyo Co., Japan) was used in place of said ground calcium carbonate having an oil absorption of 31 ml/100 g.

EXAMPLE 4

A coated sheet was obtained in the same way as in Example 1 except that the amount of said ground calcium carbonate was 60 parts in place of 80 parts and the amount of said aluminum hydroxide was 40 parts in place of 20 parts.

EXAMPLE 5

A coated sheet was obtained in the same way as in Example 1 except that said ground calcium carbonate having an oil absorption of 31 ml/100 g was replaced by barium sulfate having an oil absorption of 20 ml/100 g ("BARIFINE BF-10" made by Sakai Chemical Industry Co., Ltd., Japan).

EXAMPLE 6

A coated sheet was obtained in the same way as in Example 1 except that said ground calcium carbonate having an oil absorption of 31 ml/100 g was replaced by precipitated calcium carbonate having an oil absorption of 30 ml/100 g ("Silver W" made by Shiraishi Kogyo Co., Japan).

EXAMPLE 7

A coated sheet was obtained in the same way as in Example 1 except that the pigment mixture comprising 80 parts ground calcium carbonate and 20 parts aluminum hydroxide was replaced by a pigment mixture comprising 90 parts of the same ground calcium carbonate as in Example 1 and 10 parts titanium oxide ("FR-44" made by Furukawa Mining Co., Ltd., Japan).

EXAMPLE 8

A pigment slurry having a solid matter concentration of 65% was obtained by mixing, by means of an agitator, 80 parts ground calcium carbonate having an oil absorption of 44 ml/100 g ("Softon 3200" made by Bihoku Funka Kogyo Co., Japan), 20 parts kaolin having an oil absorption of 39 ml/100 g ("HT Clay" made by EMC, USA) and 0.8 part sodium polyacrylate. The pigment slurry thus obtained was mixed with 4 parts (solid matter) epoxy resin ("DENACOL EX-810" made by NAGASE CHEMICALS LTD, Japan), 20 parts (solid matter) styrene-butadiene copolymer latex having a butadiene content of 80% ("L-1195$_{05}$" made by Asahi Chemical Industry Co., Ltd., Japan), 15 parts (solid matter) methyl acrylate-butadiene copolymer latex having a butadiene content of 31% ("P-OX55P" made by Sumitomo Naugatuck Co., Ltd., Japan), 3 parts (solid matter) antistatic agent, 2 parts (solid matter) zirconium ammonium carbonate and water so that the solid matter concentration was 45%. Thus, a coating composition of pigments was obtained.

The coating composition was applied by means of a bar coater onto one side of a transparent polyester film having a thickness of 75 μm ("ESTER FILM A-1300" made by Toyobo Co., Ltd., Japan) so that the dry weight was 10 g/m$^2$. Then, the polyester film was dried for 30 seconds by means of a hot air drier at a temperature of 60° C., and calendered by means of a supercalender. Thus, a coated sheet was obtained.

EXAMPLE 9

A coated sheet was obtained in the same way as in Example 8 except that said ground calcium carbonate having an oil absorption of 44 ml/100 g was replaced by precipitated calcium carbonate having an oil absorption of 75 ml/100 g ("TNC-C120" made by TOYO DENKA KOGYO CO., LTD., Japan).

EXAMPLE 10

A coated sheet was obtained in the same way as in Example 8 except that said 80 parts ground calcium carbonate having an oil absorption of 44 ml/100 g was replaced by 20 parts calcined kaolin having an oil absorption of 110 ml/100 g and 60 parts ground calcium carbonate having an oil absorption of 44 ml/100 g.

EXAMPLE 11

A coated sheet was obtained in the same way as in Example 1 except that said epoxy resin was replaced by polyvinyl alcohol ("PVA117" made by Kuraray Co., Ltd., Japan).

EXAMPLE 12

A coated sheet was obtained in the same way as in Example 1 except that said styrene-butadiene copolymer latex was replaced by styrene-butadiene copolymer latex having a butadiene content of 41% ("L-15717" made by Asahi Chemical Industry Co., Ltd., Japan).

EXAMPLE 13

A coated sheet was obtained in the same way as in Example 1 except that said styrene-butadiene copolymer latex was replaced by acrylic copolymer latex ("Acronal YJ-2741D" made by MITSUBISHI YUKA BADISCHE COMPANY LIMITED, Japan).

EXAMPLE 14

A coated sheet was obtained in the same way as in Example 1 except that the amount of said epoxy resin was changed to 10 parts.

EXAMPLE 15

A coated sheet was obtained in the same way as in Example 1 except that the amount of said epoxy resin was changed to 0.5 part.

COMPARATIVE EXAMPLE 1

A coated sheet was obtained in the same way as in Example 1 except that said ground calcium carbonate was replaced by barium sulfate having an oil absorption of 7.7 ml/100 g ("BA" made by Sakai Chemical Industry Co., Ltd., Japan).

COMPARATIVE EXAMPLE 2

A coated sheet was obtained in the same way as in Example 8 except that said ground calcium carbonate having an oil absorption of 44 ml/100 g was replaced by calcined kaolin having an oil absorption of 110 ml/100 g ("Ansilex" made by EMC, USA).

COMPARATIVE EXAMPLE 3

A coated sheet was obtained in the same way as in Example 2 except that 0.05 part gray dye ("TB2695 NEZUMI" made by Dainichiseika Colour & Chemicals Mfg. Co., Ltd., Japan) was added to said coating composition of pigments.

The 15 sheets of Examples 1 to 15 and 3 sheets of Comparative Examples 1 to 3 were printed as described below. The characteristics of the printed sheets thus obtained were evaluated as in the following. The results of the evaluation are shown in Table 1.

Water Resistance

Each of said sheets were immersed in water for 24 hours. Then, the surface of the coating layer of each sheet was rubbed 10 times with a finger to see if the coating layer peeled off. The state of the coating layer is represented in Table 1 by the following six valuations.

1: The coating layer did not peel off at all. Very strong.
2: The coating layer did not peel off but it was a little slippery.
3: The coating layer peeled off slightly. There was no problem in practice.
4: The coating layer peeled off. There was a problem in practice.
5: The coating layer peeled off readily.
6: The coating layer peeled off at the time of the first rubbing. Very weak.

Opacity

Opacity (%) was determined by a method in accordance with JIS P-8138. As the value increased the opacity increased.

Ink Densities on the Printed Side and Non-Printed Side of Each Printed Sheet Each of said sheets was printed on a 4-color offset press ("MITSUBISHI DIA 4E-4") by using inks of four colors ("SPACE COLOR GRAF-F" made by Dainippon Ink And Chemicals, Incorporated, Japan) which were black, blue, red and yellow and used in this order. Ink density on the printed side of each sheet and ink density on the non-printed side thereof were determined by means of an ink density meter ("D-142-3" made by GRETAG, Switzerland). In the determination, the density of yellow ink was determined at the same spot on both sides of the sheet. As the value increases, the ink density increased.

Difference Between Ink Densities on the Printed Side and the Non-Printed Side of Each Sheet The difference between the ink density on the printed side of each sheet and the ink density on the non-printed side thereof was obtained by the following equation:

$$DX = \frac{A - B}{A} \times 100$$

Notes:
DX: Difference between ink densities (%)
A, B: Ink densities on the printed side and the non-printed side. "A" is a higher ink density. "B" is a lower ink density.

As the value of DX increases, the difference between the ink densities is larger and the printed image on the printed side looks increasingly different from the printed image on the non-printed side.

TABLE 1

| | Film sheet | | | Ink density | | |
|---|---|---|---|---|---|---|
| | water resistance | brightness (%) | opacity (%) | printed side | non-printed side | DX (%) |
| Example 1 | 2 | 75 | 40 | 1.95 | 1.60 | 18 |
| Example 2 | 2 | 68 | 28 | 1.33 | 1.20 | 10 |
| Example 3 | 2 | 79 | 50 | 1.98 | 1.52 | 23 |
| Example 4 | 2 | 80 | 47 | 1.41 | 1.24 | 12 |
| Example 5 | 2 | 73 | 35 | 1.96 | 1.57 | 20 |
| Example 6 | 2 | 77 | 44 | 2.03 | 1.52 | 25 |
| Example 7 | 2 | 79 | 51 | 1.97 | 1.52 | 23 |
| Example 8 | 3 | 73 | 35 | 2.05 | 1.84 | 10 |
| Example 9 | 3 | 75 | 43 | 1.98 | 1.62 | 18 |
| Example 10 | 3 | 80 | 52 | 2.10 | 1.57 | 25 |
| Example 11 | 6 | 75 | 40 | 1.95 | 1.54 | 21 |
| Example 12 | 3 | 75 | 43 | 1.95 | 1.58 | 19 |
| Example 13 | 3 | 76 | 42 | 1.91 | 1.59 | 17 |
| Example 14 | 1 | 73 | 40 | 1.90 | 1.61 | 15 |
| Example 15 | 5 | 76 | 45 | 1.97 | 1.58 | 20 |
| Comp. Example 1 | 2 | 63 | 15 | 0.71 | 0.73 | 3 |
| Comp. Example 2 | 3 | 83 | 75 | 2.30 | 1.08 | 53 |
| Comp. Example 3 | 2 | 47 | 28 | 1.04 | 0.88 | 15 |

As apparent from Table 1, the printed sheet of the present invention has a high ink density on both the printed side and the non-printed side thereof, and the difference between the ink density on the printed side and the ink density on the non-printed side is not very large. Therefore, the image printed on the sheet of the present invention looks well-balanced on both sides of the sheet. If a pigment having a small oil absorption is used, the opacity of the printed image portion is too low and the ink density of said image is too low. If a pigment having a too large oil absorption is used, ink penetration is limited and, as a result, the opacity of the printed image is too high, thus the image on the printed side looks very different from the image on the non-printed side. When the difference between said ink densities is maintained below 35%, the printed sheet has an excellent contrast on both sides thereof.

If the adhesives in the coating composition of pigments include one or more epoxy resins and thermoplastic resins, the coating layer itself has a high water resistance and therefore the printed sheet can be used outdoors.

What is claimed is:

1. A printed film sheet comprising a transparent film sheet provided with a coating composition containing one or more pigments and one or more adhesives, the improvement comprising said pigments including one or more pigments having a linseed oil absorption of 10 to 80 ml/100 g, said one or more pigments being present in an amount of 70 to 100% by weight of the total pigment content, said film sheet having a brightness of above 50% and an opacity of 20 to 60%, said film sheet being printed such that the difference between the ink density of a printed image on the printed side of said film sheet and the ink density of the printed image on the non-printed side of said film sheet is below 35%.

2. A printed film sheet as claimed in claim 1, wherein said adhesives include one or more epoxy resins and one or more thermoplastic resins, the amount of said epoxy resins being 1 to 20% by weight of the total pigment content.

3. A printed film sheet as claim in claim 2, wherein said thermoplastic resins include one or more thermoplastic resins having a degree of kerosine swelling of 80 to 200%, said one or more thermoplastic resins being present in an amount of 10 to 50% by weight of the total pigment content.

4. A printed film sheet as claimed in claim 2, wherein said thermoplastic resin is a butadiene copolymer containing butadiene in an amount of 45 to 90% weight of the total copolymer weight.

5. A printed film sheet as claimed in claim 3, wherein said thermoplastic resin is a butadiene copolymer containing butadiene in an amount of 45 to 90% by weight of the total copolymer weight.

6. A printed film sheet as claimed in claim 1, wherein the difference between the ink density on the printed side and the ink density on the non-printed side is below 30%.

7. A printed film sheet as claimed in claim 1, wherein the adhesives are present in an amount of 5 to 60 parts per 100 parts of pigments.

8. A printed film sheet as claimed in claim 1, wherein the film sheet has a thickness of from about 10 to 500 μm.

9. A printed film sheet as claimed in claim 1, wherein the amount of the coating composition is from about 2 to 60 $g/m^2$.

10. A printed film sheet comprising a transparent film sheet provided with a coating composition containing one or more pigments and one or more adhesives, the improvement comprising said pigments including one or more pigments having a linseed oil absorption of 10 to 80 ml/100 g, said one or more pigments being present in an amount of 70 to 100% by weight of the total pigment content and said adhesives being present in an amount of 5 to 60 parts per 100 parts of pigments, the coating composition being provided in an amount of from about 2 to 60 $g/m^2$ and said film sheet having a brightness of above 50% and an opacity of 20 to 60% and being printed such that the difference between the ink density of a printed image on the printed side of the film sheet and the ink density of the printed image on the non-printed side of the film sheet is below 30%.

* * * * *

UNITED STATES PATENT AND TRADEMARK OFFICE
CERTIFICATE OF CORRECTION

PATENT NO. : 5 217 791

DATED : June 8, 1993

INVENTOR(S) : Seigoro FUJITA et al

It is certified that error appears in the above-identified patent and that said Letters Patent is hereby corrected as shown below:

Column 12, line 34; after "90%" insert ---by---.

Signed and Sealed this

Twenty-second Day of March, 1994

Attest:

Bruce Lehman

BRUCE LEHMAN

*Attesting Officer* *Commissioner of Patents and Trademarks*